US009798784B1

(12) United States Patent
Wong et al.

(10) Patent No.: US 9,798,784 B1
(45) Date of Patent: Oct. 24, 2017

(54) SYSTEM, METHOD AND COMPUTER PROGRAM PRODUCT FOR DEFINING CUSTOM JUNCTION OBJECTS IN AN ON-DEMAND DATABASE SERVICE

(75) Inventors: Simon Wong, San Carlos, CA (US); Ryan Choi, Foster City, CA (US); Craig Weissman, San Francisco, CA (US); Michael P. Polcari, Foster City, CA (US); David M. Brady, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 829 days.

(21) Appl. No.: 12/196,876

(22) Filed: Aug. 22, 2008

(51) Int. Cl.
*G06F 17/30* (2006.01)

(52) U.S. Cl.
CPC .. *G06F 17/30551* (2013.01); *G06F 17/30539* (2013.01)

(58) Field of Classification Search
CPC ......... G06F 17/30327; G06F 17/30321; G06F 17/30536; G06F 17/30539; G06F 17/30551
USPC ............ 707/785, 786, 97, 803, 711, 713, 71
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,680,603 A * | 10/1997 | Bhargava et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,930,801 A * | 7/1999 | Falkenhainer ...... G06F 21/6218 |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |

(Continued)

OTHER PUBLICATIONS

Shea et al. (WO 03/096225).*
"Flexible Support for Multiple Access Control Policies" Jajodia et al. (Jun. 2001).*

(Continued)

*Primary Examiner* — Vincent F Boccio
(74) *Attorney, Agent, or Firm* — Haynes Beffel & Wolfeld LLP; Ernest J. Beffel, Jr.

(57) ABSTRACT

In accordance with embodiments, there are provided mechanisms and methods for defining custom junction objects in an on-demand database service. These mechanisms and methods for defining custom junction objects in an on-demand database service can enable embodiments to provide for enhanced security and more efficient querying, etc. The ability of embodiments to provide such features may lead to these and other benefits in an on-line environment.

20 Claims, 6 Drawing Sheets

(56) References Cited

U.S. PATENT DOCUMENTS

| | | |
|---|---|---|
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,754,885 B1 * | 6/2004 | Dardinski .......... G05B 19/0426 717/113 |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,076,736 B2 * | 7/2006 | Hugh ........................... 715/743 |
| 7,181,758 B1 | 2/2007 | Chan |
| 7,209,929 B2 | 4/2007 | Dominguez, Jr. et al. ... 707/103 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,774,366 B2 | 8/2010 | Fisher et al. |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0095408 A1 * | 7/2002 | Cheng ............... G06F 17/30595 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins ....................... 709/203 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0019494 A1 * | 1/2004 | Ridgeway ........... G06Q 10/0637 705/26.1 |
| 2004/0019518 A1 * | 1/2004 | Abraham et al. ................ 705/10 |
| 2004/0027388 A1 | 2/2004 | Berg et al. |
| 2004/0128001 A1 | 7/2004 | Levin et al. |
| 2004/0186845 A1 * | 9/2004 | Fukui ................. G06F 17/30327 707/999.1 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. ................ 707/4 |
| 2005/0091098 A1 | 4/2005 | Brodersen et al. |
| 2005/0223022 A1 | 10/2005 | Weissman et al. ........... 707/102 |
| 2005/0283478 A1 | 12/2005 | Choi et al. ........................ 707/9 |
| 2006/0021019 A1 | 1/2006 | Hinton et al. |
| 2006/0206834 A1 | 9/2006 | Fisher et al. ................... 715/777 |
| 2006/0206866 A1 * | 9/2006 | Eldrige ............ G05B 19/41845 717/122 |
| 2006/0282433 A1 * | 12/2006 | Dutta et al. ....................... 707/9 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

"The ultimate guide to datetime data types." Nucleus as indexed by internet archive (Apr. 15, 2004).*

"Using the catalog views to see table permissions" Louis Davidson as indexed by internet archive (Jul. 4, 2007).*

U.S. Appl. No. 60/828,192, filed Oct. 4, 2006.

U.S. Appl. No. 10/817,161, filed Apr. 2, 2004.

* cited by examiner

SYSTEM, METHOD AND COMPUTER PROGRAM PRODUCT FOR DEFINING CUSTOM JUNCTION OBJECTS IN AN ON-DEMAND DATABASE SERVICE

CLAIM OF PRIORITY

This application claims the benefit of U.S. Provisional Patent Application 60/957,441 entitled "SYSTEM, METHOD AND COMPUTER PRODUCT FOR CUSTOM JUNCTION OBJECTS," by Simon Wong et al., filed Aug. 22, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to defining custom junction objects.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to define custom junction objects in the foregoing database frameworks. To date, such custom junction objects have been limited to traditional database frameworks. To this end, the various benefits that may optionally be derived from such custom junction objects have been void in on-line environments.

BRIEF SUMMARY

In accordance with embodiments, there are provided mechanisms and methods for defining custom junction objects in an on-demand database service. These mechanisms and methods for defining custom junction objects in an on-demand database service can enable embodiments to provide for enhanced security and more efficient querying, etc. The ability of embodiments to provide such features may lead to these and other benefits in an on-line environment.

In an embodiment and by way of example, a method is provided for receiving information associated with a plurality of arbitrary objects. Further, a custom junction object is defined comprising a many-to-many relationship of any tuple selected from the arbitrary objects. Still yet, information about related tuples of arbitrary objects is stored in an on-demand database service using the definition.

While the present invention is described with reference to an embodiment in which techniques for defining custom junction objects in an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for defining custom junction objects in an on-demand database service.

To date, use of custom junction objects have been limited to traditional database frameworks. To this end, the various benefits that may optionally be derived from such custom junction objects have been void in on-line environments. Thus, mechanisms and methods are provided herein for defining custom junction objects in an on-demand database service that can enable embodiments to provide for enhanced security and more efficient querying, etc. in an on-line environment.

Next, mechanisms and methods for defining custom junction objects in an on-demand database service will be described with reference to exemplary embodiments.

Figure 1:
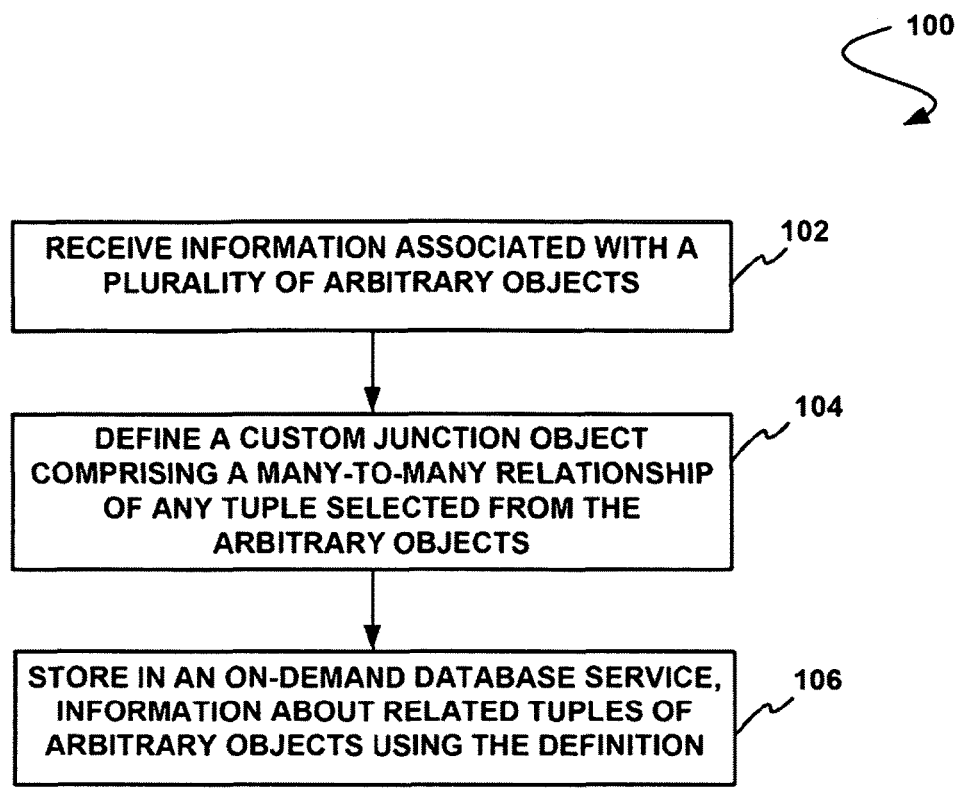
FIG. 1 shows a method for defining custom junction objects in an on-demand database service, in accordance with one embodiment.

FIG. 1 shows a method 100 for defining custom junction objects in an on-demand database service, in accordance with one embodiment. As shown, information associated with a plurality of arbitrary objects is received. See operation 102.

In this case, the objects may include any objects capable of providing information. For example, in various embodiments, the arbitrary objects may include data associated with activities, opportunities, and cases, etc. In one embodiment, the arbitrary objects may comprise a data structure (e.g. a table or list) including such data.

Further, a custom junction object comprising a many-to-many relationship of any tuple selected from the arbitrary objects is then defined. See operation 104. In this case, a tuple refers to any sequence or list of values.

In the context of the present description, a custom junction object refers to any object that supports a many-to-many relationship of any two arbitrary objects. In this case, a many-to-many relationship refers to any relationship in which a record in a first object (e.g. table, etc.) may correspond to more than one record in a second object. In one embodiment, the custom junction object may include a many-to-many relationship associated with a plurality of the arbitrary objects that have a business relationship.

With further reference to FIG. 1, information about related tuples of arbitrary objects is stored in an on-demand database service, using the definition. See operation 106. In the context of the present description, an on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Figure 2:
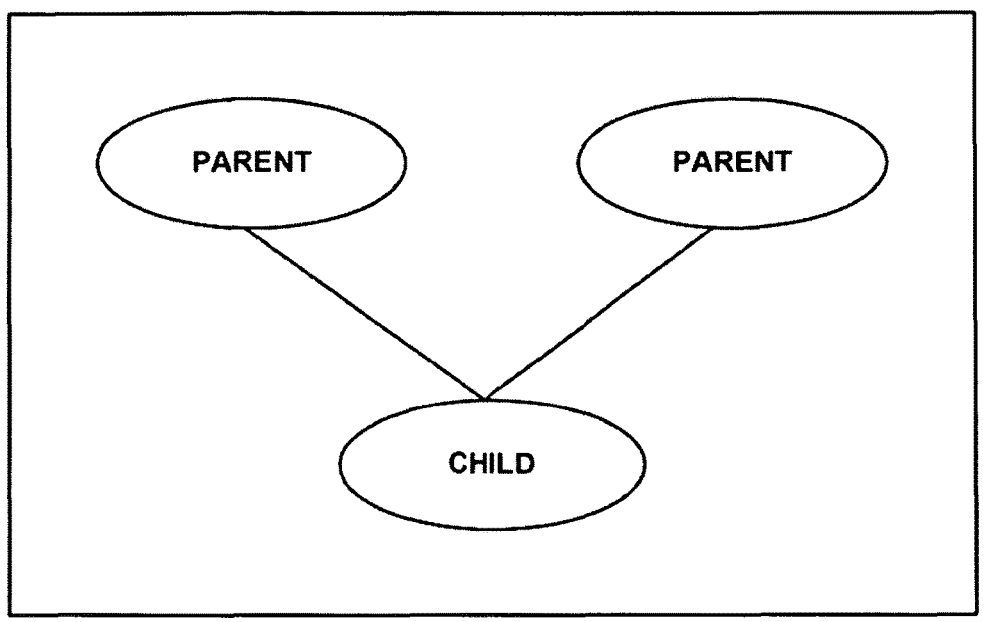
FIG. 2 shows a diagram of a first parent object, a second parent object, and at least one child object that may be used to define a many-to-many relationship of a custom junction object, in accordance with one embodiment.

In one embodiment, security criteria associated with the custom junction object may be defined and enforced. For example, the custom junction object may include a many-to-many relationship associated with a first parent object, a second parent object, and at least one child object, as shown in FIG. 2. In this case, the security criteria may allow the at least one child object to be read when both the first parent object and the second parent object are allowed to be read.

As an option, the security criteria may allow the at least one child object to be written when both the first parent object and the second parent object are allowed to be written. As another option, the security criteria may allow the at least one child object to be written when both the first parent object and the second parent object are allowed to be read. As still another option, the security criteria may allow the at least one child object to be written when at least one of the first parent object and the second parent object are allowed to be written and at least one of the first parent object and the second parent object are allowed to be read.

In this way, a security model may be applied to the custom junction object, where the security model may be inherited from at least one of a set of parents of the custom junction object. As an option, applying a security model to the custom junction object may include selectively enforcing the security model. As another option, selectively enforcing the security model may include enforcing the security model when both parents of the custom junction object are publicly shared, but may not necessarily be imposed with a database many-to-many relationship table.

In one embodiment, the custom junction object may include a many-to-many relationship associated with a plurality of the arbitrary objects associated with a single household. In the context of the present description, a household refers to a user-defined grouping of people and/or organizations. For example, the household may include a family or a business partnership.

As an option, the household may enable a user to view contact information for every member of a household. Furthermore, a household may allow the user to view all objects (e.g. activities, cases, solutions, custom objects, etc.) related to the household.

In one embodiment, the custom junction object may support household functionality including household tabs, household tab/object rename, household layouts, household record types, household overview/detail/edit, household custom fields, household Apex trigger support, household custom buttons and links, build data validations using Apex triggers/code, and support of custom object tab rename, etc.

A household member may also be configured to include any account of a person/organization that belongs to a household. In this case, the account may belong to multiple households. As a result, the underlying data model to support the household member may be a many-to-many relationship, as noted above.

In order to build the household member functionality, a new custom junction object may be generated. In one embodiment, the initial custom junction object may be parented by two arbitrary objects (e.g. a household custom object and an account, etc.). In this case, the custom junction object may include a data structure such as a table. As an option, the visibility of rows of the custom junction object may depend on read-access authorization of a user with respect to both parents. Furthermore, the ability to add/remove rows may depend on edit-access of a user with respect to both parents.

In one embodiment, the custom junction object may not include sharing rules. For example, the visibility/edit access of the custom junction object may be dependent entirely upon the parents. Furthermore, the ability to create/update rows may depend on edit-access on both parents.

Because the security of a custom junction object may be dependent upon the parents, the delete may also be dependent upon the parents. For example, a delete of a custom junction object may require access to the parents of both sets of foreign key fields of the parents.

In one embodiment, deleting either parent of the custom junction object may cause a cascade delete of the custom junction object. An undelete of the parent may also be reflected in the custom junction object, as the custom junction object may be undeleted as well. However, in some cases, deleting both parents and then undeleting both parents may cause a permanent delete of the custom junction object.

As an option, custom junction objects may not be allowed to have children entities such as activities, notes, attachments, children custom objects, etc. This may be enforced to simplify the cascade delete of custom junction objects via their parents.

In one embodiment, on a detail page of either parent of a custom junction object, a custom related list may be provided showing the custom junction objects related to that parent. For example, if a custom junction object exists between clients and cases, on the detail page of a particular client, a list of cases in which that client is involved may be displayed. Additionally, on the detail page of a particular case, the list of clients to which that case is related may be displayed.

In both cases, the sharing models may be applied such that cases on the related lists that are not normally displayed will not be displayed, even if the case is related to the particular client being viewed. As an option, this functionality may be present for every custom junction object that any customer builds. In one embodiment, this may be accomplished by a single database query which performs the steps illustrated in Table 1.

TABLE 1

| | |
|---|---|
| 1. | Start from the Household (e.g. Custom Object) |
| 2. | Drive from Household → Household sharing tables (Optional if Household is public sharing) |
| 3. | Drive from Household → Household Member (e.g. Custom Junction Object) via a Household Foreign Key (FK) field on Household Member |
| 4. | Drive from Household Member (e.g. Custom Junction Object) → Account via the Account FK on the Household Member |
| 5. | Join from Account → Account sharing tables (Optional if Account is public sharing) |
| 6. | Join Account |

In this case, sharing rules of the objects involved may be optional based on the sharing model of each parent. It should be noted that the security joins may be specific to the object parenting the custom junction object. Households and accounts are simply examples used for this feature, and such examples should not be construed as limiting in any manner.

In some embodiments, related lists may be associated with a single account. For households, related lists of items may be related to any account in the household. If a person account is a member of multiple households, this may allow entities (e.g. activities, opportunities, cases, etc.) to appear in multiple households. It is the many-to-many nature of junction objects that allows for an account to be related to multiple households and allows for a household to be related to multiple accounts. Thus, it is possible to display account X in the detail page of household Y, and display account X in the detail page of household Z.

In one embodiment, the junction object between a household and account may include extra built-in functionality not included in another custom junction object. This functionality, referred to as rollup functionality, may be configured such that account may include its own child objects, such as opportunities in an account, contacts in an account, and other child objects. The junction between household and account may be configured such that when one particular household is viewed, it is related to multiple accounts through the household member junction objects and each of those accounts are related to their own sets of opportunities, contacts, and other children. With this rollup feature, the detail page of a particular household may display a list of opportunities, contacts, and/or children that are related to any of the accounts associated with that household. In this way, it may be possible to see the same opportunity, contact, and/or child X in the detail page of household Y, and to see X again in the detail page of household Z. This is because the parent account of X is related to both households Y and Z.

Because a single database query may be ran to get all visible accounts related to a household or households, and because the visibility of child objects is determined by the visibility of the parent, the rollup functionality may be implemented by performing an extra database join to the child object from those visible accounts (e.g. after step 7 in Table 1).

When rollup is applied to activities, the set of activities related to any of the accounts that are related to a particular household may be displayed. In this case, the visibility of the activity is determined by multiple factors, rather than just that of the account.

For entity related lists (e.g. activity related lists, etc.), a separate query may be run to obtain all the accessible accounts in the household. A plsql function may then be called using those account IDs to retrieve the set of IDs of visible activities related to those accounts. Finally, the results from the plsql function may be joined against the activity table to retrieve those activities.

Figure 3:
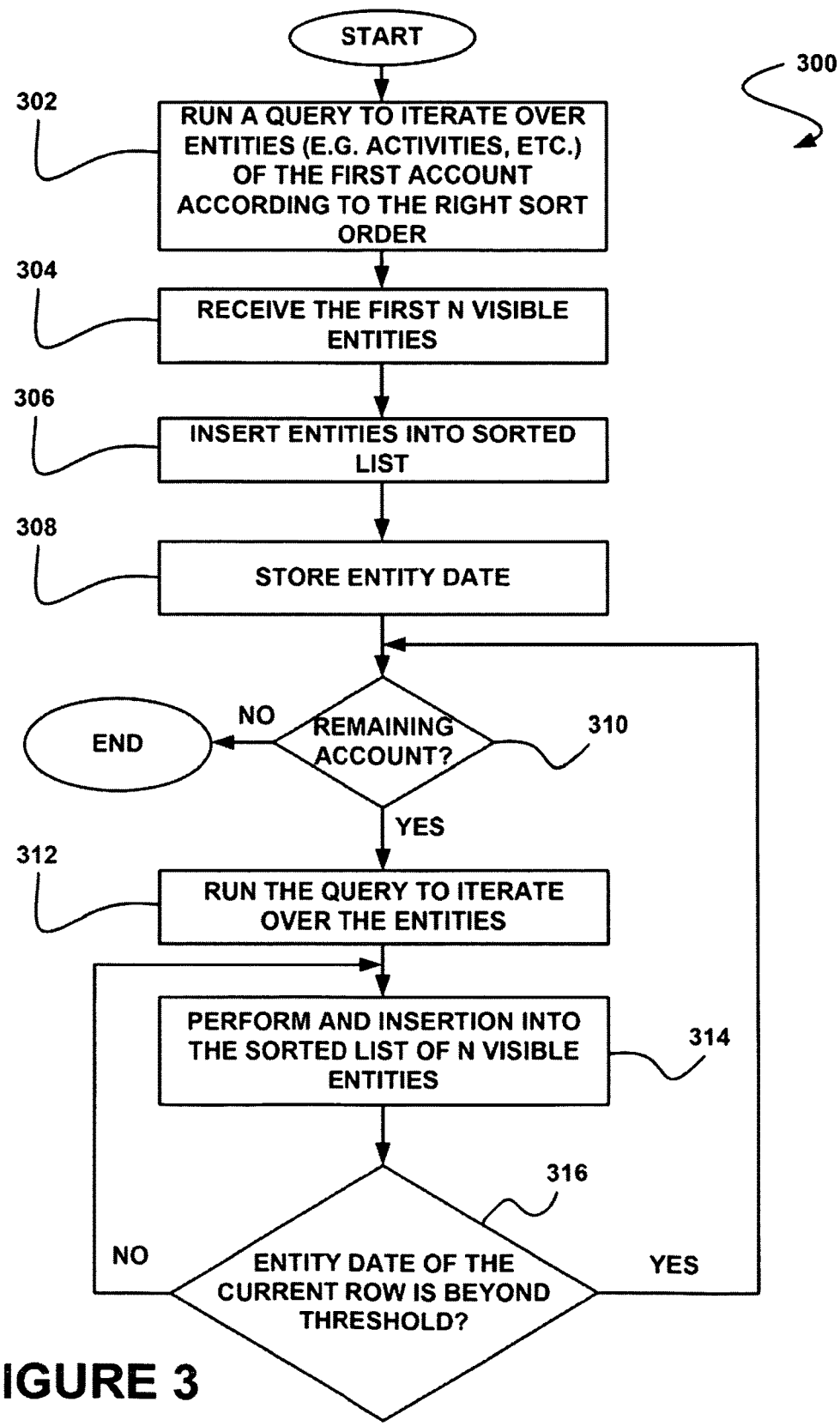
FIG. 3 shows a method for running a pipeline of queries for returning a predetermined number of temporally ordered entities associated with a plurality of accounts, in accordance with one embodiment.

FIG. 3 shows a method 300 for running a sequence of queries for returning a predetermined number of temporally ordered entities associated with a plurality of accounts, in accordance with one embodiment. As an option, the present method 300 may be implemented in the context of the functionality of FIGS. 1-2. Of course, however, the method 300 may be carried out in any desired environment. The aforementioned definitions may apply during the present description.

As shown, a query is run to iterate over entities of a first account according to a son temporal order. See operation 302. In this case, row sharing may be applied on a per row basis.

As a result of the query, the first N visible entities (e.g. activities, etc.) are received. See operation 304. In this case, N may represent any integer. For example, in various embodiments, N may be an integer between 1 and 10. Of course, in various other embodiments, N may include any integer value.

Once received, the received entities are inserted into a sorted list. See operation 306. In this case, the entities may be inserted into the sorted list.

The date of the entities is then stored. See operation 308. In one embodiment, the entity dates may be stored in an array. It is then determined whether there are any remaining accounts. See operation 310.

If there are remaining accounts, the query is run to iterate over the entities. See operation 312. Furthermore, the first available N visible entities (e.g. activities, etc.) are retrieved and inserted into the sorted list. See operation 314. In this case, the number of visible entries may be less than the number of the visible entries in the first query.

It is then determined whether an entity date of the current row is beyond a threshold. See operation 316. If the entity date of the current row is beyond the threshold, the query is terminated. For example, the query may be terminated as soon as the entity date of the current row is beyond the Nth visible account in the sorted list.

At the end of the plsql function, the sorted list of activities is returned, and the caller may join that against the activity table. In this way, while running one query for each account, asymptotically fewer and fewer entity rows per account may be fetched towards the latter accounts. In this way, by limiting the queries, processing resources and bandwidth resources may be conserved.

In one embodiment, there may be an existing pipeline function that returns the ID of visible activities that are related to a given account, ordered by date. This pipeline function may run a query to find activities related to a given account, determine if the activities are visible according to the sharing model, and return the visible activities one-by-one. As an option, this pipeline functionality may be used in the context of operations 302 and 312 of FIG. 3. It should be noted that when using the method 300 described in FIG. 3, each subsequent call to the pipeline function (e.g. using different account IDs) may return asymptotically fewer and fewer activities, until the threshold is crossed. Thus, processing resources may be reduced.

Figure 4:
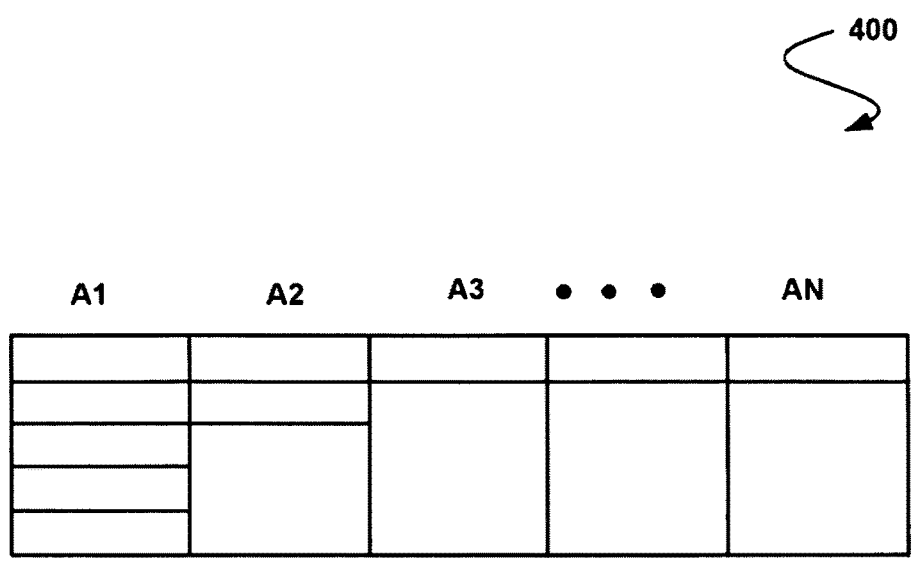
FIG. 4 shows a diagram illustrating the reduction of a number of rows per account after running a pipeline of queries, in accordance with one embodiment.

FIG. 4 shows a diagram 400 illustrating the reduction of a number of rows per account after running a pipeline of queries for returning a predetermined number of temporally ordered entities associated with a plurality of accounts A1-AN, in accordance with one embodiment.

In operation, a first query may be run for a predetermined number (e.g. 5, etc.) of temporally ordered entities (e.g. activities, cases, solutions, and custom objects, etc.) associated with a first account A1. A second query for temporally ordered entities associated with a second account A2 may then be limited. For example, the second query may be limited by determining whether a date associated with at least one of the temporally ordered entities would result in the at least one of the temporally ordered entities not being included in the predetermined number of temporally ordered entities. In this case, the at least one of the temporally ordered entity may be conditionally retrieved based on the determination. Thus, fewer and fewer entity rows per account are fetched as the account number shown in FIG. 4 increases.

System Overview

Figure 5:
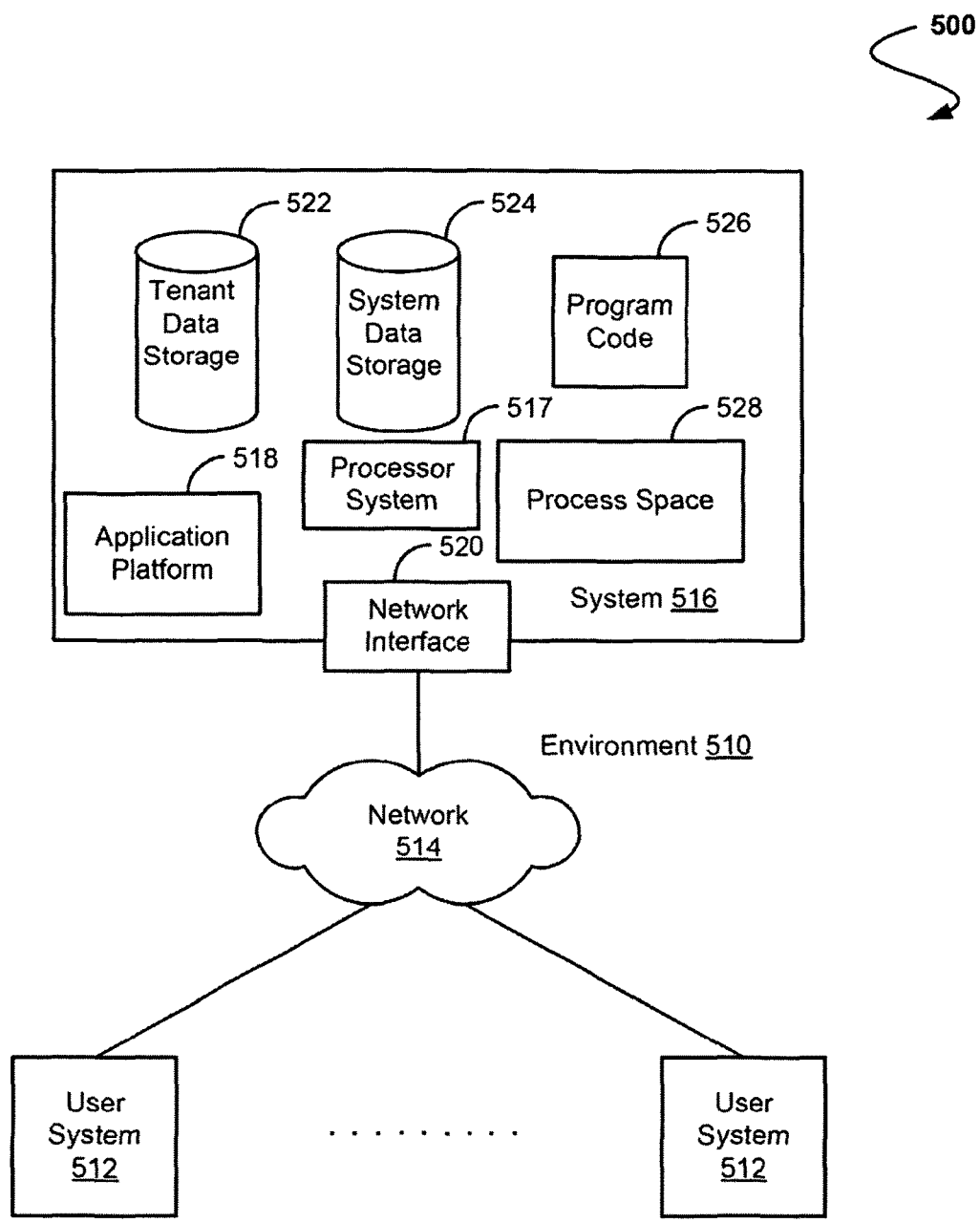
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Figure 6:
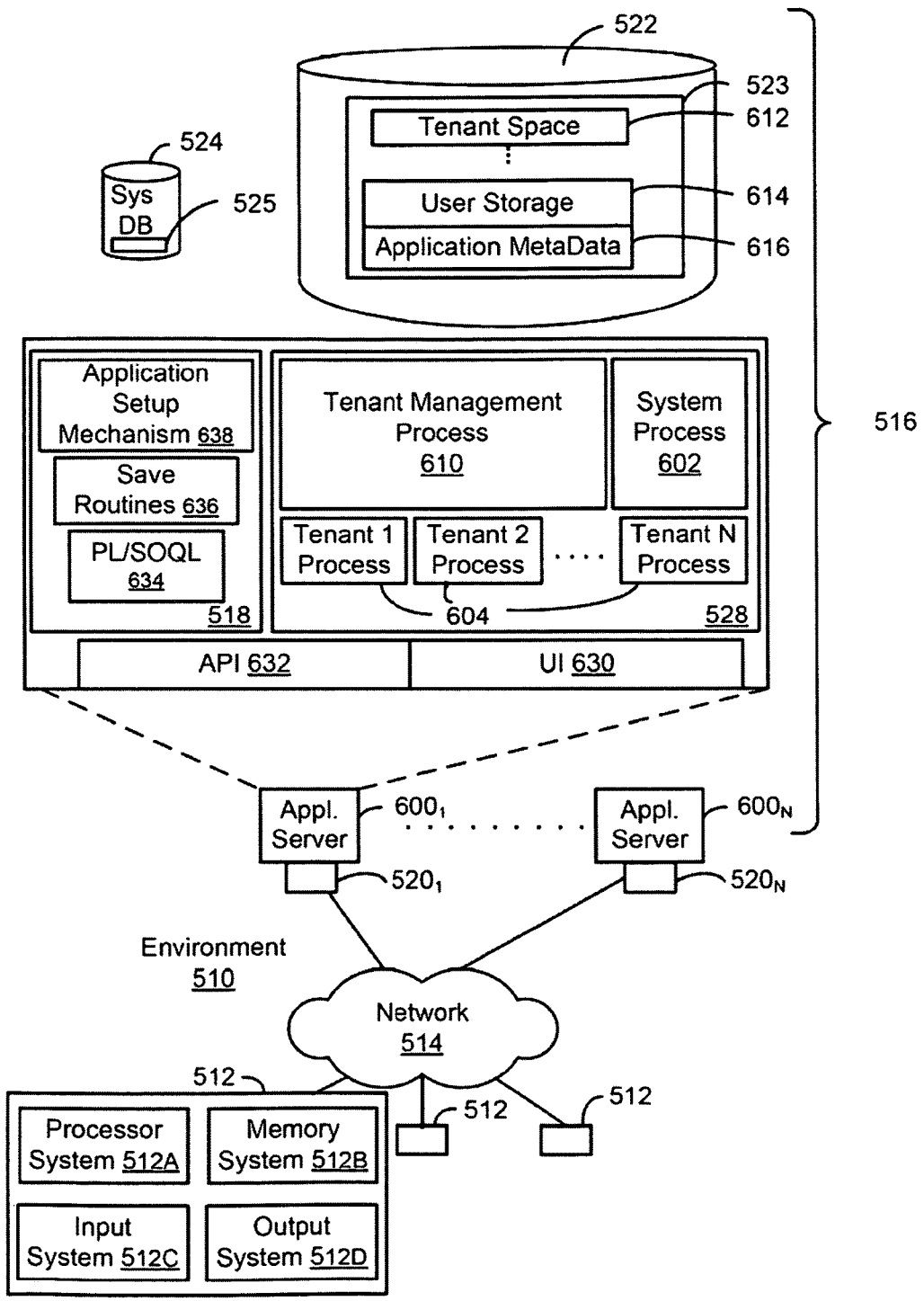
FIG. 6 illustrates a block diagram of an embodiment of elements of FIG. 5 and various possible interconnections between these elements.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in. FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system. 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 6, including a network interface 520, application platform 518, tenant data storage 522 for tenant data 523, system data storage 524 for system data accessible to system 516 and possibly multiple tenants, program code for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 6 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 530, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600, might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g. an application server 600 in system 516) automatically generates one or more SQL statements (e.g. one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of implementing a many-to-many relationship among objects defined for business entities or business activities using database tables in an on-demand database service, the method comprising:

receiving information associated with a plurality of arbitrary objects defined in the on-demand database service;

defining a custom junction object comprising a many-to-many relationship of any tuple selected from the plurality of arbitrary objects, wherein the custom junction object includes at least a first direct parent-child relationship implementing the many-to-many relationship that includes a first parent object and a plurality of child objects, and a second parent-child relationship that includes a second parent object, and the plurality of child objects;

storing in the on-demand database service, custom junction objects including information about related tuples of arbitrary objects using the custom junction object defined;

defining one or more read-write security criteria associated with the custom junction object and enforcing the read-write security criteria, wherein the read-write security criteria applicable to the child objects depend on a combined evaluation of read-write security criteria applicable to both the first parent object and the second parent object;

receiving from a source a first query of a pipeline of queries that when run return a predetermined number of temporally ordered entities associated with a plurality of accounts of the on-demand database service;

running the first query for a predetermined number of temporally ordered entities associated with a first account;

limiting a second query for temporally ordered entities associated with a second account by conditionally retrieving at least one of temporally ordered entities associated with a second account based on a determination whether a date associated with the at least one of the temporally ordered entities would result in the at least one of the temporally ordered entities not being included in the predetermined number of temporally ordered entities; and using the custom junction object to provide a result to at least one query, wherein visibility of child objects in the result is determined by visibility to the source of the first parent object and visibility to the source of the second parent object; thereby ensuring that the source receives in the result only business entities or business activities of child objects whose parent objects are visible to the source.

2. The method of claim 1, wherein combined evaluation of first and second parents read-write security criteria allows a child object to be written when both the first parent object and the second parent object are allowed to be read, but not written.

3. The method of claim 1, wherein the combined evaluation of first and second parents read-write security criteria allows a child object to be written when at least one of the first parent object and the second parent object are allowed to be written and at least one of the first parent object and the second parent object are allowed to be read but not written.

4. The method of claim 1, wherein the custom junction object comprises a many-to-many relationship associated with a plurality of the arbitrary objects associated with a single household.

5. The method of claim 1, wherein the custom junction object comprises a many-to-many relationship associated with a plurality of the arbitrary objects that have a business relationship.

6. The method of claim 1, wherein the on-demand database service includes a multi-tenant on-demand database service.

7. The method of claim 1, further comprising displaying a detail page associated with at least one parent of the custom junction object, the detail page including a custom related list showing one or more custom junction objects related to at least one parent.

8. The method of claim 1, further comprising displaying a detail page associated with a household, the detail page including a list of children related to one or more accounts associated with the household.

9. The method of claim 1, wherein the first parent object and the second parent object are both parent objects to each one of the plurality of child objects.

10. The method of claim 9, wherein the read-write security criteria is selectively enforced by enforcing the read-write security criteria when both the first parent object and the second parent object are publicly shared.

11. The method of claim 1, wherein the combined evaluation of first and second parents read-write security criteria allows a child object to be read when both the first parent object and the second parent object are allowed to be read.

12. The method of claim 1, wherein the combined evaluation of first and second parents read-write security criteria allows a child object to be written when both the first parent object and the second parent object are allowed to be written.

13. The method of claim 1, wherein
the on-demand database service includes database tables defining at least one account object, a second object, and
a custom junction object that links the account object and the second object as parents in a many-to-many relationship with the plurality of child objects as descendants, the method further comprising:
receiving a request by a user to add a further child object to the plurality of child objects;
determining permission of the user to add the further child object by evaluating read-write security criteria controlling access by the user to the account object and also evaluating read-write security criteria controlling access by the user to the second object;
granting to the user, permission to add the further child object that exceeds the read-write security criteria controlling access by the user to at least one of the account object or to the second object; and
using the custom junction object to control visibility to the user of the further child object, wherein visibility of the further child object to the user is determined by visibility to the user of the account object and visibility to the user of the second object; thereby ensuring that the user has visibility to only those child objects whose parent objects are visible to the user.

14. The method of claim 13, wherein the custom junction object is further linked to permissions data for both the account object and the second object and does not include sharing rules.

15. The method of claim 14, wherein deletion of the custom junction object includes cascading deletion of the plurality of child objects.

16. The method of claim 14, wherein the user inherits permission to add a further child from both the account object and the second object according to a rule that the user is granted permission to add a further child object when the user has read but not write access to both the account object and the second object.

17. The method of claim 14, wherein the user inherits permission to add a further child from both the account object and the second object according to a rule that the user is granted permission to add a further child object when the user has read but not write access to one of the account object and the second object and has read-write access to an other of the account object and the second object.

18. A non-transitory machine-readable medium impressed with computer program instructions to implement a many-to-many relationship among objects defined for business entities or business activities using database tables in an on-demand database service, which instructions, when executed, cause one or more processors to carry out:
receiving information associated with a plurality of arbitrary objects defined in the on-demand database service;
defining a custom junction object comprising a many-to-many relationship of any tuple selected from the plurality of arbitrary objects, wherein the custom junction object includes at least a first direct parent-child relationship implementing the many-to-many relationship that includes a first parent object and a plurality of child objects, and a second parent-child relationship that includes a second parent object, and the plurality of child objects;
storing in the on-demand database service, custom junction objects including information about related tuples of arbitrary objects using the custom junction object defined;
defining one or more read-write security criteria associated with the custom junction object and enforcing the read-write security criteria, wherein the read-write security criteria applicable to the child objects depend on a combined evaluation of read-write security criteria applicable to both the first parent object and the second parent object;
receiving from a source a first query of a pipeline of queries that when run return a predetermined number of temporally ordered entities associated with a plurality of accounts of the on-demand database service;
running the first query for a predetermined number of temporally ordered entities associated with a first account;

limiting a second query for temporally ordered entities associated with a second account by conditionally retrieving at least one of temporally ordered entities associated with a second account based on a determination whether a date associated with the at least one of the temporally ordered entities would result in the at least one of the temporally ordered entities not being included in the predetermined number of temporally ordered entities; and using the custom junction object to provide a result to at least one query, wherein visibility of child objects in the result is determined by visibility to the source of the first parent object and visibility to the source of the second parent object; thereby ensuring that the source receives in the result only business entities or business activities of child objects whose parent objects are visible to the source.

19. An apparatus, comprising:

a processor; and a non-transitory computer readable memory with one or more stored sequences of computer program instructions to implement a many-to-many relationship among objects defined for business entities or business activities using database tables in an on-demand database service, which instructions, when executed by the processor, cause the processor to carry out:

receiving information associated with a plurality of arbitrary objects defined in the on-demand database service;

defining a custom junction object comprising a many-to-many relationship of any tuple selected from the plurality of arbitrary objects, wherein the custom junction object includes at least a first direct parent-child relationship implementing the many-to-many relationship that includes a first parent object and a plurality of child objects, and a second parent-child relationship that includes a second parent object, and the plurality of child objects;

storing in the on-demand database service, custom junction objects including information about related tuples of arbitrary objects using the custom junction object defined;

defining one or more read-write security criteria associated with the custom junction object and enforcing the read-write security criteria, wherein the read-write security criteria applicable to the child objects depend on a combined evaluation of read-write security criteria applicable to both the first parent object and the second parent object;

receiving from a source a first query of a pipeline of queries that when run return a predetermined number of temporally ordered entities associated with a plurality of accounts of the on-demand database service;

running the first query for a predetermined number of temporally ordered entities associated with a first account;

limiting a second query for temporally ordered entities associated with a second account by conditionally retrieving at least one of temporally ordered entities associated with a second account based on a determination whether a date associated with the at least one of the temporally ordered entities would result in the at least one of the temporally ordered entities not being included in the predetermined number of temporally ordered entities; and using the custom junction object to provide a result to at least one query, wherein visibility of child objects in the result is determined by visibility to the source of the first parent object and visibility to the source of the second parent object; thereby ensuring that the source receives in the result only business entities or business activities of child objects whose parent objects are visible to the source.

20. A method for transmitting code for implementing a many-to-many relationship among objects defined for business entities or business activities using database tables in a multi-tenant database system on a transmission medium, the method comprising:

transmitting code for receiving information associated with a plurality of arbitrary objects defined in the multi-tenant database system;

transmitting code for defining a custom junction object comprising a many-to-many relationship of any tuple selected from the plurality of arbitrary objects, wherein the custom junction object includes at least a first direct parent-child relationship implementing the many-to-many relationship that includes a first parent object and a plurality of child objects, and a second parent-child relationship that includes a second parent object, and the plurality of child objects;

transmitting code for storing in the multi-tenant database system, custom junction objects including information about related tuples of arbitrary objects using the custom junction object defined;

transmitting code for defining one or more read-write security criteria associated with the custom junction object and enforcing the read-write security criteria, wherein the read-write security criteria applicable to the child objects depend on a combined evaluation of read-write security criteria applicable to both the first parent object and the second parent object;

transmitting code for receiving from a source a first query of a pipeline of queries that when run return a predetermined number of temporally ordered entities associated with a plurality of accounts of the multi-tenant database system;

transmitting code for running the first query for a predetermined number of temporally ordered entities associated with a first account;

transmitting code for limiting a second query for temporally ordered entities associated with a second account by conditionally retrieving at least one of temporally ordered entities associated with a second account based on a determination whether a date associated with the at least one of the temporally ordered entities would result in the at least one of the temporally ordered entities not being included in the predetermined number of temporally ordered entities; and transmitting code for providing a result to at least one query using the custom junction object, wherein visibility of child objects in the result is determined by visibility to the source of the first parent object and visibility to the source of the second parent object.

* * * * *